United States Patent
Mika

(10) Patent No.: US 7,683,895 B2
(45) Date of Patent: Mar. 23, 2010

(54) MULTI-PURPOSE PEN

(76) Inventor: Jeanne M. Mika, 311 Glenwood Ave., Willow Springs, IL (US) 60480

( * ) Notice: Subject to any disclaimer, the term of this patent is extended or adjusted under 35 U.S.C. 154(b) by 871 days.

(21) Appl. No.: 11/443,892

(22) Filed: May 31, 2006

(65) Prior Publication Data

US 2007/0280772 A1  Dec. 6, 2007

(51) Int. Cl.
G06F 3/033 (2006.01)
(52) U.S. Cl. .............. 345/179; 401/32; 401/31
(58) Field of Classification Search ......... 401/33
See application file for complete search history.

(56) References Cited

U.S. PATENT DOCUMENTS

| | | | |
|---|---|---|---|
| 4,692,046 A * | 9/1987 | Lan | 401/32 |
| 5,713,680 A * | 2/1998 | Yoshino et al. | 401/30 |
| 6,050,735 A | 4/2000 | Hazzard | |
| 6,227,743 B1 | 5/2001 | Robb | |
| 6,361,232 B1 | 3/2002 | Nagaoka et al. | |
| 6,450,721 B1 | 9/2002 | D'Amico et al. | |
| 6,533,483 B2 * | 3/2003 | Carroll et al. | 401/194 |
| 6,575,596 B2 | 6/2003 | Butt | |
| 6,633,282 B1 | 10/2003 | Monroe | |
| 6,702,500 B1 | 3/2004 | Haffner et al. | |
| 6,749,354 B2 | 6/2004 | Kageyama et al. | |
| 7,080,949 B1 * | 7/2006 | Yamamoto | 401/33 |
| 2003/0118391 A1 | 6/2003 | Adams | |
| 2005/0163555 A1 * | 7/2005 | Cetera | 401/131 |

* cited by examiner

Primary Examiner—Alexander Eisen
Assistant Examiner—Robin Mishler
(74) Attorney, Agent, or Firm—Dale J. Ream

(57) ABSTRACT

A multi-purpose pen includes a housing having upper and lower ends and defining upper and lower openings, respectively. A carriage is rotatably mounted in the housing and is adjustably positionable by a user. Multiple implements, such as an ink assembly and a stylus may be coupled to the carriage, each implement having a tip for selective protrusion through the lower housing opening. A plunger is operatively coupled to the housing adjacent the upper opening and includes a plate for selectively urging one of the implements downwardly toward the lower opening according to a position of the carriage. The plate includes openings so that only a single implement is urged downward when the plunger is depressed while the other implements are allowed to remain in a stationary or storage configuration.

15 Claims, 5 Drawing Sheets

MULTI-PURPOSE PEN

BACKGROUND OF THE INVENTION

This invention relates generally to writing instruments and, more particularly, to a multi-purpose pen having multiple implements that may be selectively extended for use.

Personal Digital Assistants ("PDA's") have become very popular for organizing one's business, education, and personal life, such as scheduling events, taking notes, etc. These devices typically require a generally pointed object known as a stylus to select on-screen options, enter data, and the like. It is inconvenient, however, to keep track of a stylus for the PDA and a traditional pen for many other writing tasks. In addition, it is recognized that other electronic devices often require a different type of stylus. For example, larger touch screens such as those used in retail stores or industrial facilities require use of a larger stylus for touch screen selection of input choices.

Various devices have been proposed in the art for combining the utility of an ink pen and a stylus. The existing devices either provide different implement tips at opposed ends of a single rod or uniquely attach one implement to another. Although assumably effective for their intended purposes, there is still a need for a multi-purpose pen having multiple implements that may be selectively lowered to a use position while all of the unselected implements remain hidden away in a pen housing.

Therefore, it would be desirable to have a multi-purpose pen for providing a user with selective access to at least one stylus in addition to a traditional pen. Further, it would be desirable to have a multi-purpose pen in which individual implements remain stationary while a selected implement may be selectively lowered for use. In addition, it would be desirable to have a multi-purpose pen in which a user can identify and select a desired implement for use.

SUMMARY OF THE INVENTION

Accordingly, a multi-purpose pen according to the present invention includes a housing having upper and lower ends defining a selection window and respective upper and lower openings. A carriage is rotatably mounted inside the housing and is accessible through the selection window such that a user may adjust the position of the carriage. An ink assembly is operatively coupled to the carriage and includes a tip for selective protrusion through the lower opening of the housing. Similarly, a first stylus may also be operatively coupled to the carriage and include a tip for selective protrusion through the lower opening. In like manner, a second stylus having a tip different than the first stylus tip may also be operatively coupled to the carriage. A plunger is positioned in the housing and includes a plate to selectively urge only one of the implements downwardly toward the lower opening according to the position of the carriage.

Therefore, a general object of this invention is to provide a multi-purpose pen for enabling a user to access and operate a selected implement.

Another object of this invention is to provide a multi-purpose pen, as aforesaid, in which individual implements may remain in a stationary storage configuration while a single implement is urged downwardly toward a pen housing open end.

Still another object of this invention is to provide a multi-purpose pen, as aforesaid, in which a user may identify, select, and deploy a desired implement for usage.

Yet another object of this invention is to provide a multi-purpose pen, as aforesaid, in which a traditional pen may be positioned within a housing along with at least one stylus for use with an electronic device.

A further object of this invention is to provide a multi-purpose pen, as aforesaid, having a plunger for selectively urging a selected implement to a use position.

A still further object of this invention is to provide a multi-purpose pen, as aforesaid, that is easy to use and economical to manufacture.

Other objects and advantages of the present invention will become apparent from the following description taken in connection with the accompanying drawings, wherein is set forth by way of illustration and example, an embodiment of this invention.

BRIEF DESCRIPTION OF THE DRAWINGS

FIG. 3 is a partially exploded view of the multi-purpose pen as in FIG. 1a;

DESCRIPTION OF THE PREFERRED EMBODIMENT

A multi-purpose pen 100 according to the present invention will now be described in detail with reference to FIGS. 1a through 5 of the accompanying drawings. More particularly, a multi-purpose pen 100 according to the current invention includes an elongate housing 110, a carriage 120, and a plurality of implements 130.

Figures 1A, 1B:
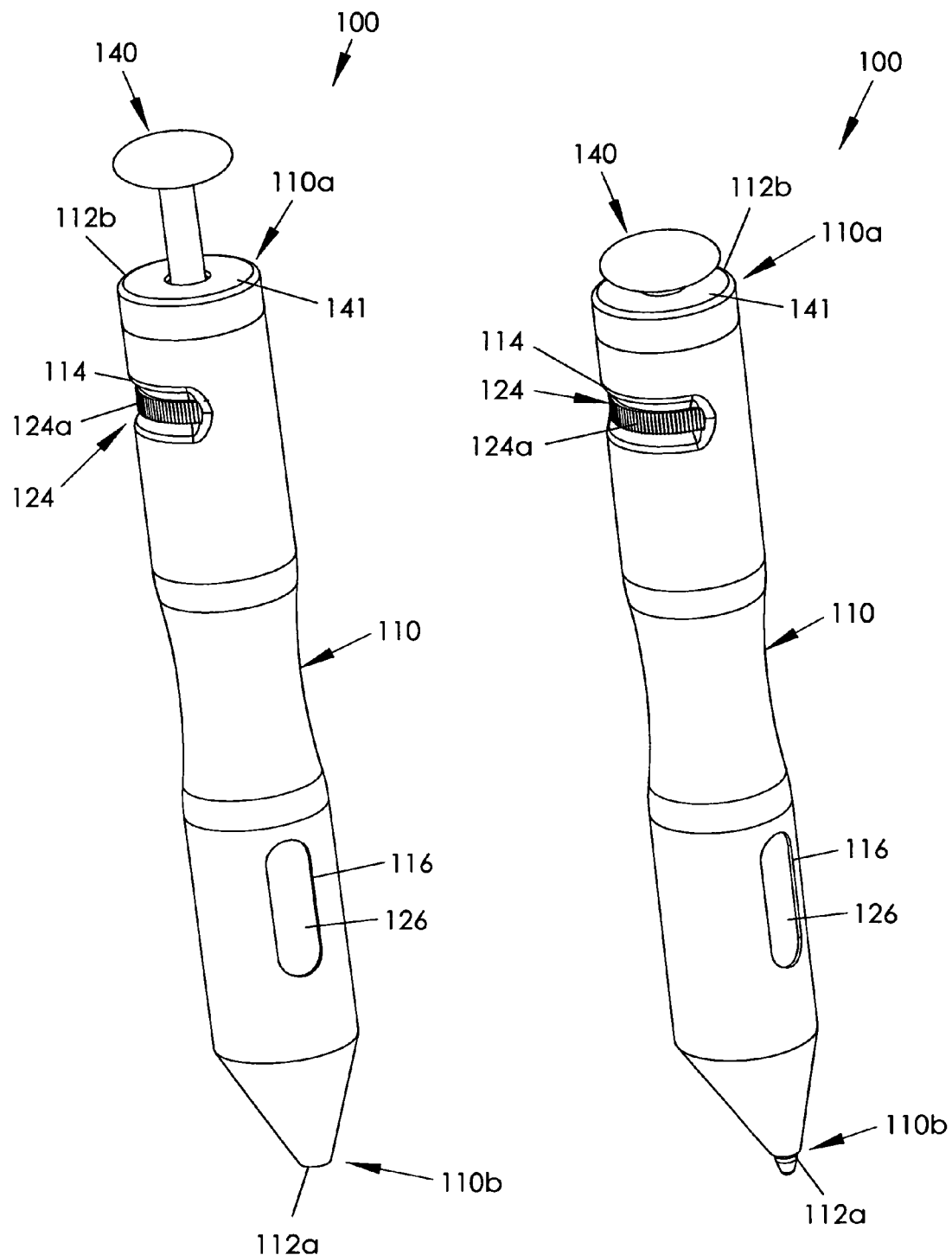
FIG. 1a is a perspective view of a multi-purpose pen according to a preferred embodiment of the present invention with a plunger at an extended or non-actuated configuration.
FIG. 1b is another perspective view of the multi-purpose pen as in FIG. 1a with the plunger at an actuated configuration.

The elongate housing 110 has opposed upper and lower ends 110a, 110b and defines a selection window 114. The lower end 110a defines a lower opening 112a, and the upper end 110b defines an upper opening 112b. An imaginary center axis (not shown) extends between the upper and lower ends 110a, 110b, and the lower opening 112a may be offset from the imaginary center axis (FIG. 1b). The housing 110 may define an indicator window 116, as shown in FIGS. 1a and 1b, and the housing may (FIG. 3) or may not (FIGS. 1a and 1b) be separable.

Figure 2A:
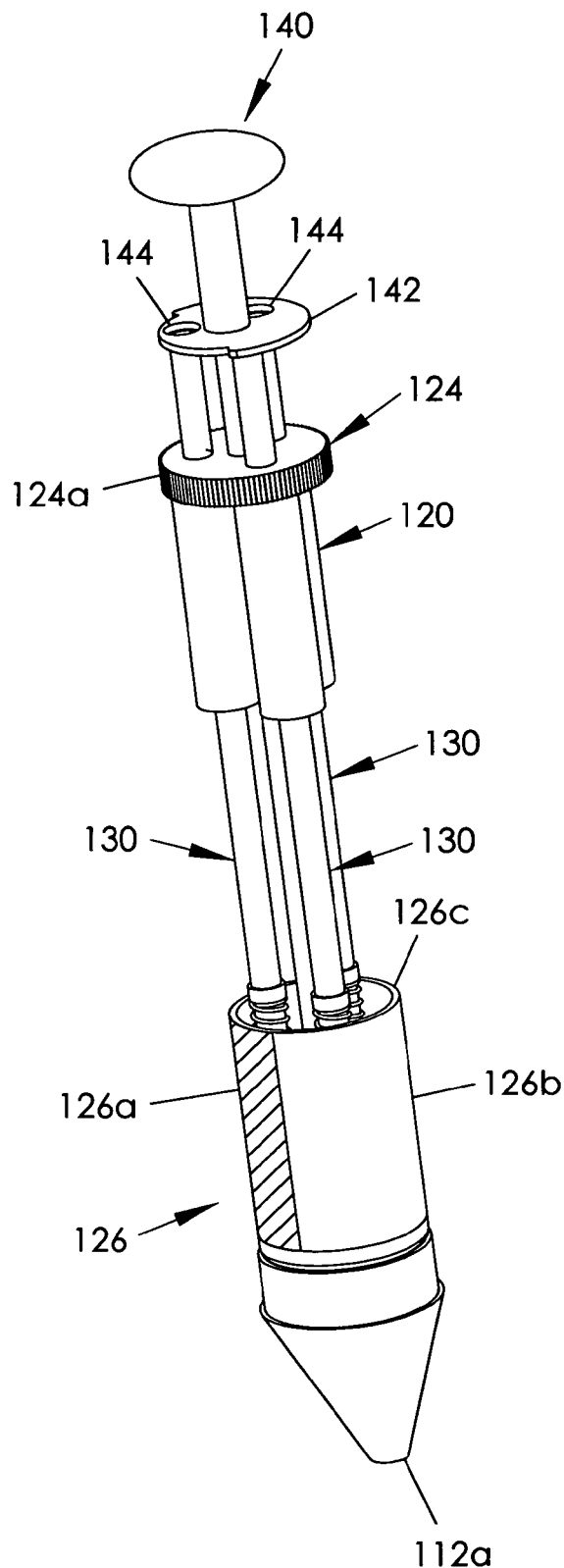
FIG. 2a is a perspective view of the multi-purpose pen as in FIG. 1a with the housing removed.
Figure 4:
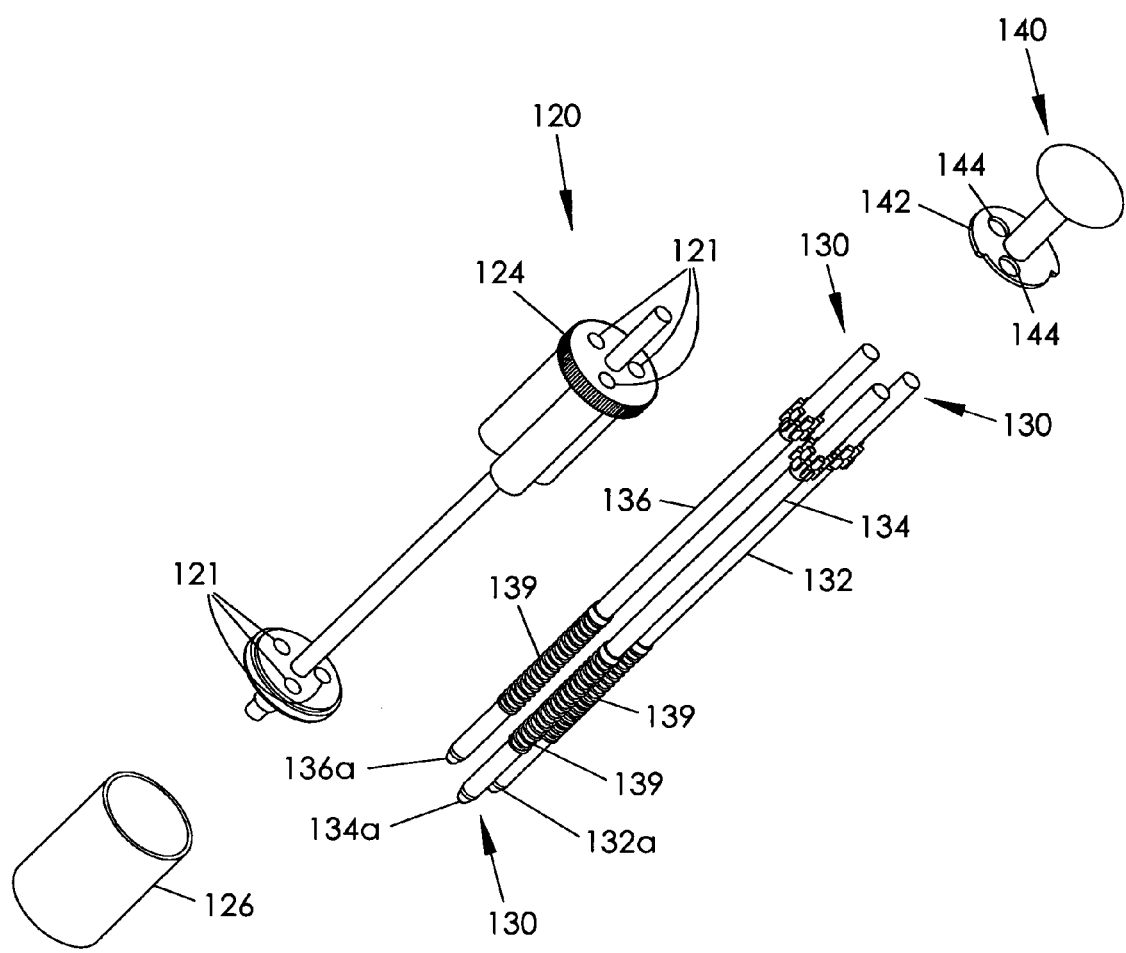
FIG. 4 is a completely exploded view of the multi-purpose pen as in FIG. 1a with the housing removed.

The carriage 120 is rotatably positioned inside the housing 110, and the carriage 120 may be accessible through the selection window 114 to adjust a position of the carriage 120. More particularly, the carriage 120 may include a selector wheel 124 that is accessible through the selection window 114 to adjust the position of the carriage 120. The selector wheel 124 may present a gripping surface 124a, which may be coarse or rubber-like, for example. As shown in FIG. 4, the carriage 120 may include holes 121 through which the implements 130 may pass, and an indicator 126 may be attached to the carriage 120. The indicator 126 may have a first portion 126a that corresponds to a first implement 130, a second portion 126b that corresponds to a second implement 130, and a third portion 126c that corresponds to a third implement 130 to indicate the position of the carriage 120 (FIG. 2a).

One of the implements 130 may be an ink assembly 132 (FIG. 4) operatively coupled to the carriage 120 (e.g., by passing through the holes 121), and the ink assembly 132 preferably has a tip 132a for selectively protruding through the lower opening 112a. One of the implements 130 may be a PDA stylus 134 (FIG. 4) operatively coupled to the carriage 120 (e.g., by passing through the holes 121), and the PDA stylus 134 preferably has a tip 134a for selectively protruding through the lower opening 112a. One of the implements 130 may be a touch screen stylus 136 (FIG. 4) operatively coupled to the carriage 120 (e.g., by passing through the holes 121), and the touch screen stylus 136 preferably includes a tip 136a for selectively protruding through the lower opening 112a. The ink assembly 132, the PDA stylus 134, and the touch screen stylus 136 may be offset from the imaginary center axis, and as shown in FIGS. 2a through 4, the ink assembly 132, the PDA stylus 134, and the touch screen stylus 136 may be separated by approximately 120 degrees about the imaginary center axis. It should be appreciated that the touch screen stylus tip 136a presents a configuration different than a configuration of the PDA stylus tip 134a. A first spring 139 may be in communication with one stylus 130 to bias the stylus 130 away from the housing's lower opening 112a, a second spring 139 may be in communication with another stylus 130 to bias the stylus 130 away from the housing's lower opening 112a, and a third spring 139 may be in communication with an ink assembly 130 to bias the ink assembly 130 away from the housing's lower opening 112a.

Figure 5:
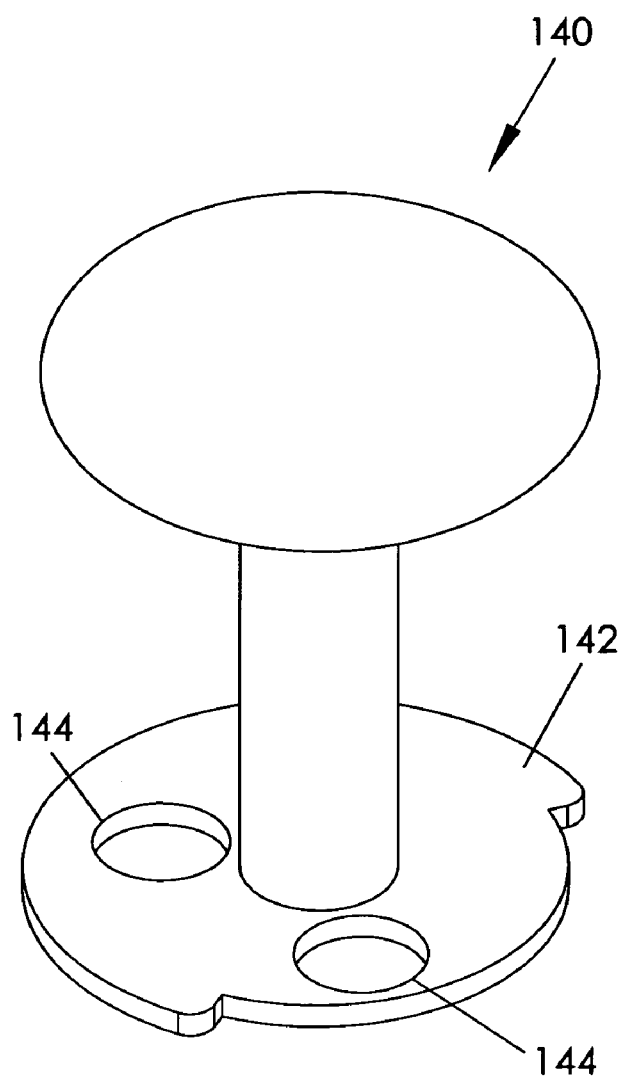
FIG. 5 is a isolated perspective view on an enlarged scale of the plunger.

A plunger 140 may be operatively coupled to the housing 110 adjacent the upper opening 112b (e.g., by a cap 141). The plunger 140 may have a plate 142 to selectively urge only one implement 130 toward the lower opening 112a according to the position of the carriage 120. In other words, the position of the carriage 120 determines which implement 130 is urged toward the lower opening 112a by the plate 142. As shown in FIG. 5, the plate 142 may define openings 144 to allow all but one implement 130 to remain stationary when the plate 142 is moved downwardly. In other words, the position of the carriage 120 determines which implements 130 are allowed to remain stationary when the plate 142 is actuated.

Figure 3:
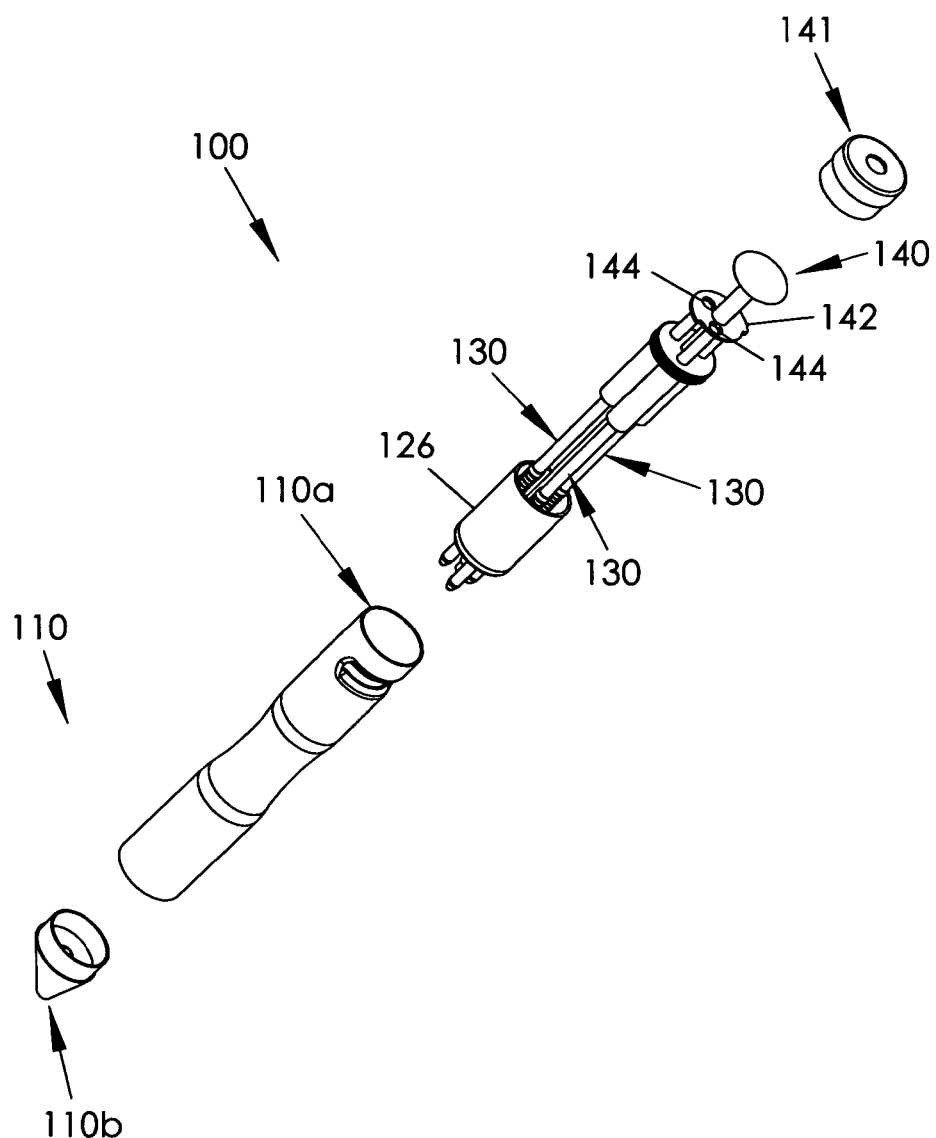

To assemble the multi-purpose pen 100, the ink assembly 132, the PDA stylus 134, and the touch screen stylus 136 may be inserted in the holes 121 as shown in FIG. 3. The carriage 120 and the implements 130 may then be inserted in the housing 110, and the cap 141 may couple the plunger 140 to the housing 110.

Figure 2B:
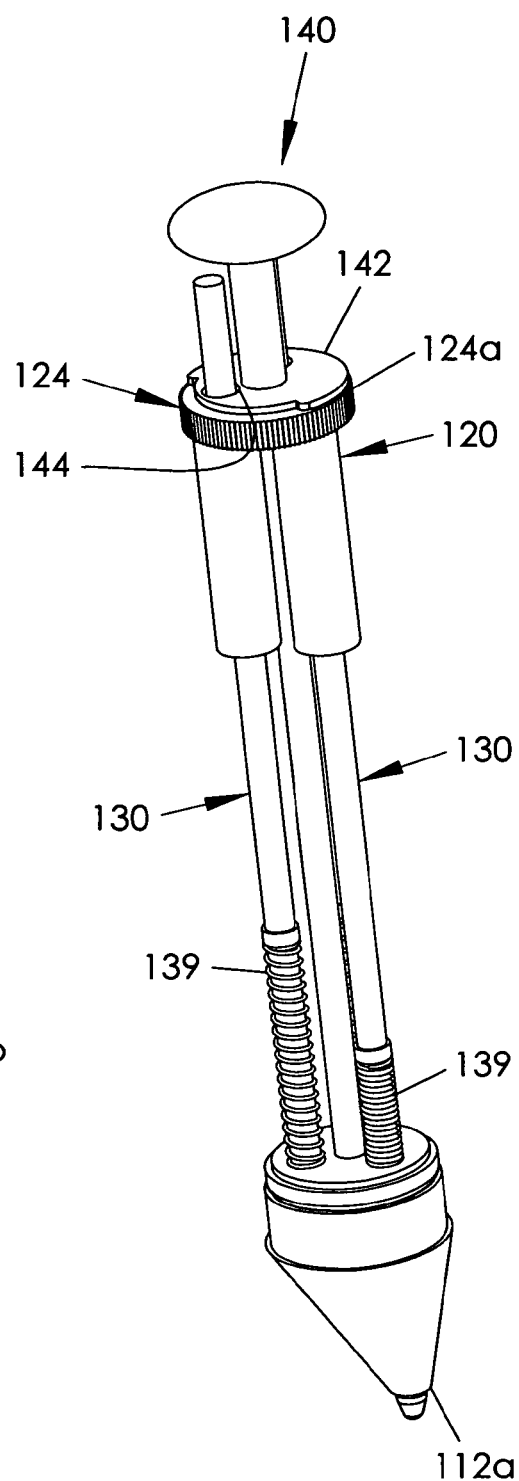
FIG. 2b is a perspective view of the multi-purpose pen as in FIG. 1b with the housing removed.

In use, the selector wheel 124 may be adjusted through the selection window 114, and the user may view the indicator 126 to determine which implement 130 is adjacent the lower opening 112a. Once the desired implement 130 is adjacent the lower opening 112a, the plunger 140 may be moved downwardly (FIGS. 1b and 2b). As the plunger 140 moves downwardly, the plate 142 urges the tip of the selected implement 130 through the lower opening 112a; the unselected implements 130 pass through the openings 144 and remain stationary. A locking mechanism known in the art may allow the selected implement 130 to remain actuated until the plunger 140 is pressed again, and the spring 139 may cause the implement 130 return to its previous position (FIG. 2a).

It is understood that while certain forms of this invention have been illustrated and described, it is not limited thereto except insofar as such limitations are included in the following claims and allowable functional equivalents thereof.

What is claimed is as follows:

1. A multi-purpose pen, comprising:
    an elongate housing having opposed upper and lower ends and defining a selection window, said lower end defining a lower opening and said upper end defining an upper opening;
    a carriage rotatably positioned inside said housing, said carriage having a selector wheel accessible through said selection window to adjust a position of said carriage;
    an ink assembly operatively coupled to said carriage, said ink assembly having a tip for selective protrusion through said lower opening of said housing;
    a first stylus operatively coupled to said carriage, said first stylus having a tip for selective protrusion through said lower opening of said housing;
    a second stylus operatively coupled to said carriage, said second stylus being distinct from said first stylus and having a tip for selective protrusion through said lower opening of said housing;
    a plunger operatively coupled to said housing adjacent said upper opening, said plunger having a plate to selectively urge only one of said ink assembly, said first stylus, and said second stylus toward said lower opening according to said position of said carriage;
    said housing defines an indicator window that is distinct from said selection window; and
    an indicator is attached to said carriage, said indicator having a first portion that corresponds to said ink assembly, a second portion that corresponds to said first stylus, and a third portion that corresponds to said second stylus, wherein a respective indicator portion is visible through said indicator window to indicate said position of said carriage.

2. The pen of claim 1, wherein said plate defines two openings for allowing two of said ink assembly, said first stylus, and said second stylus to remain stationary according to said position of said carriage.

3. The pen of claim 1, wherein:
    said housing has an imaginary center axis extending between said upper and lower ends;
    said lower opening is offset from said imaginary center axis; and
    said ink assembly, said first stylus, and said second stylus are offset from said imaginary center axis, respectively.

4. The pen of claim 3, wherein said ink assembly, said first stylus, and said second stylus are separated by approximately 120 degrees about said imaginary center axis, respectively.

5. The pen of claim 1, wherein said first stylus is a PDA stylus and said second stylus is a touch screen stylus.

6. The pen of claim 1, wherein
    said selector wheel presents a gripping surface.

7. The pen of claim 1, wherein a cap couples said plunger to said housing.

8. The pen of claim 1, wherein said ink assembly, said first stylus, and said second stylus are operatively coupled to said carriage by passing through holes in said carriage, respectively.

9. The pen of claim 1, wherein:
    a first spring is in communication with said first stylus to bias said first stylus away from said lower opening of said housing;
    a second spring is in communication with said second stylus to bias said second stylus away from said lower opening of said housing; and
    a third spring is in communication with said ink assembly to bias said ink assembly away from said lower opening of said housing.

10. A multi-purpose pen, comprising:
- an elongate housing having opposed upper and lower ends and defining a selection window proximate said upper end, said lower end defining a lower opening and said upper end defining an upper opening;
- a carriage rotatably positioned inside said housing, said carriage having a selector wheel being accessible through said selection window to adjust a position of said carriage;
- a first implement operatively coupled to said carriage, said first implement having a tip for selective protrusion through said lower opening of said housing;
- a second implement operatively coupled to said carriage, said second implement having a tip for selective protrusion through said lower opening of said housing;
- a third implement operatively coupled to said carriage, said third implement having a tip for selective protrusion through said lower opening of said housing;
- a plunger operatively coupled to said housing adjacent said upper opening, said plunger having a plate to selectively urge only one of said first implement, said second implement, and said third implement toward said lower opening according to said position of said carriage;
- said housing defines an indicator window that is distinct from said selection window and proximate said housing lower end; and
- an indicator is attached to said carriage, said indicator having a first portion that corresponds to said ink assembly, a second portion that corresponds to said first stylus, and a third portion that corresponds to said second stylus, wherein a respective indicator portion is visible through said indicator window to indicate said position of said carriage.

11. The pen of claim 10, wherein at least one of said first implement, said second implement, and said third implement is a stylus.

12. The pen of claim 10, wherein:
- one of said first implement, said second implement, and said third implement is an ink assembly;
- one of said first implement, said second implement, and said third implement is a PDA stylus; and
- one of said first implement, said second implement, and said third implement is a touch screen stylus.

13. The pen of claim 10, wherein said plate defines two openings for allowing two of said first implement, said second implement, and said third implement to remain stationary according to said position of said carriage.

14. The pen of claim 13, wherein:
- said housing has an imaginary center axis extending between said upper and lower ends;
- said lower opening is offset from said imaginary center axis;
- said first implement, said second implement, and said third implement are offset from said imaginary center axis, respectively;
- said selector wheel presents a gripping surface.

15. The pen of claim 14, wherein:
- one of said first implement, said second implement, and said third implement is an ink assembly;
- one of said first implement said second implement and said third implement is a PDA stylus; and
- one of said first implement said second implement and said third implement is a touch screen stylus.

* * * * *